March 27, 1962 — H. C. RICE — 3,027,192
VEHICLE SEAT ASSEMBLY
Filed Aug. 3, 1959 — 3 Sheets-Sheet 1

INVENTOR.
HERBERT C. RICE
BY Robert A. Sloman
ATTORNEY

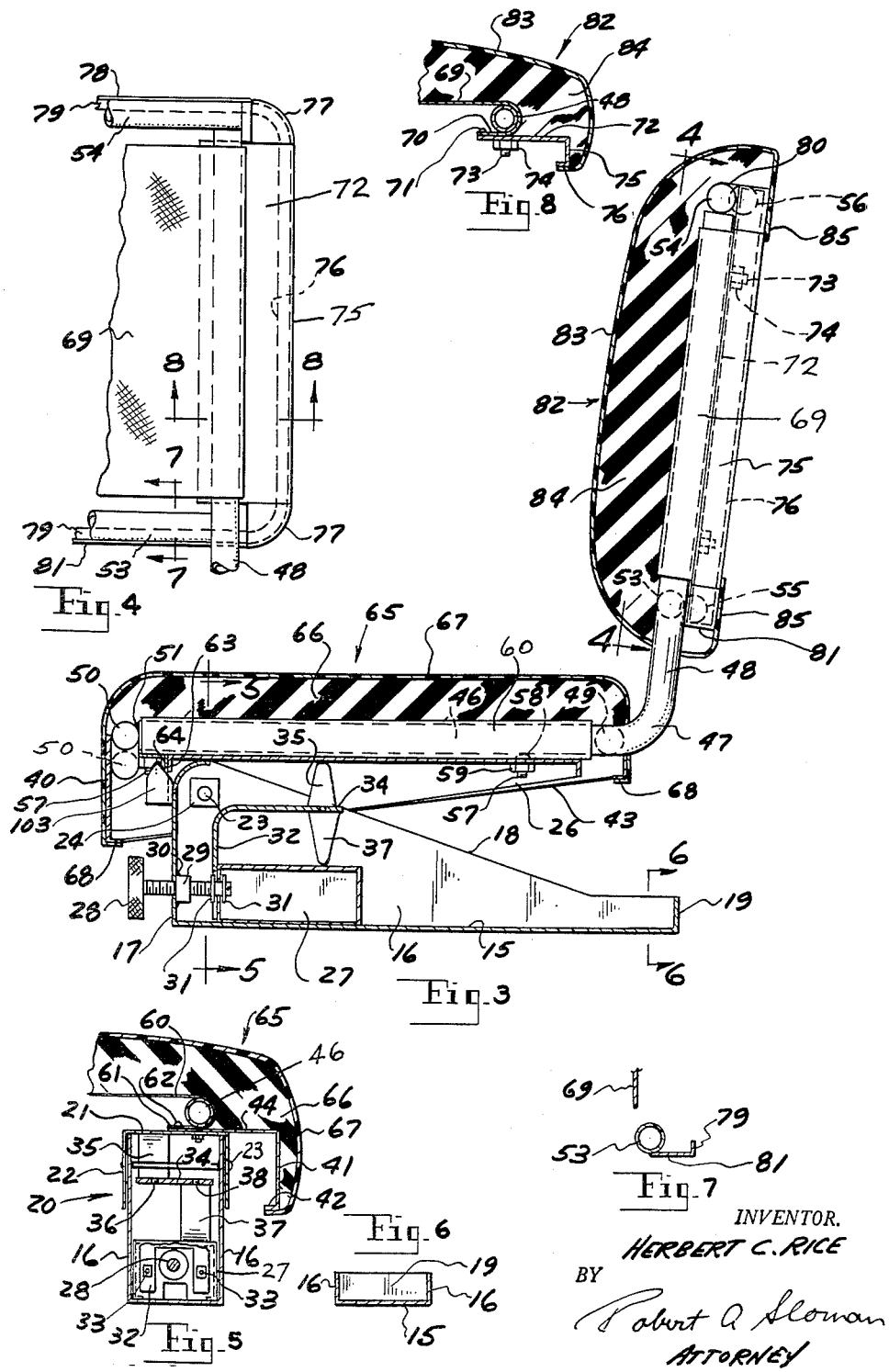

March 27, 1962  H. C. RICE  3,027,192
VEHICLE SEAT ASSEMBLY
Filed Aug. 3, 1959  3 Sheets-Sheet 3
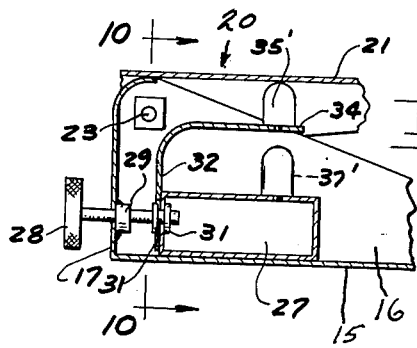
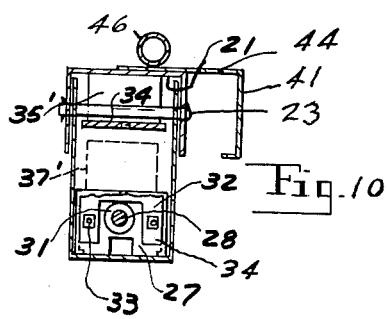
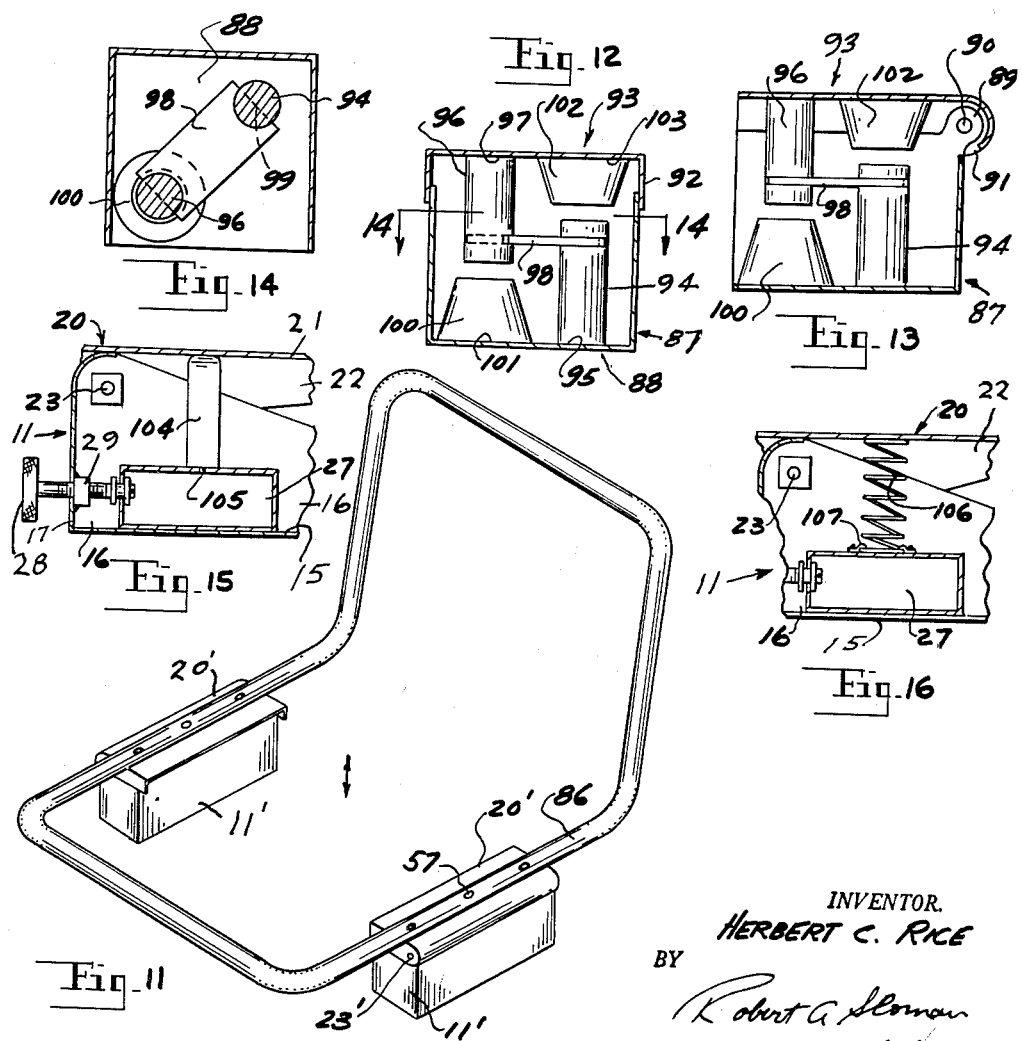
INVENTOR.
HERBERT C. RICE
BY
Robert G. Sloman
ATTORNEY

United States Patent Office 3,027,192
Patented Mar. 27, 1962

3,027,192
VEHICLE SEAT ASSEMBLY
Herbert C. Rice, 623 Delaware Ave., Detroit 2, Mich., assignor of one-quarter to Midland Adhesive & Chemical Corporation, Detroit, Mich., a corporation of Michigan
Filed Aug. 3, 1959, Ser. No. 831,230
1 Claim. (Cl. 297—308)

This invention relates to an automotive seat and more particularly an improved seat construction adapted for tractors, trucks or passenger cars.

Heretofore, in many seat constructions, particularly those adapted for trucks, there has long existed the "soft" seat which merely absorbs, i.e., keeps the user "on the move" and is fatiguing.

It is the object of the present invention to provide in a seat construction a new method of absorption and dampening of vibrations in order to achieve a level ride under all road conditions. This is accomplished by employing an offset suspension of weight rather than the conventional direct suspension of weight which has been generally used since the inception of motor cars and trucks.

With offset suspension, there is gained the important advantage of "leverage on the medium of resiliency" i.e., using a torque plate or spring plate and rubber. It is this leverage that provides the desired absorption and dampening resulting in a level ride.

Because of the leverage and the buoyancy and range of the torque plate and the rubber, the vibrations produced by rough riding surfaces is absorbed by "knee-action" within the resiliency medium or torque plate without being transferred to the occupant seat or center of gravity.

Heretofore in the direct type of suspension, the seat springs had a tendency to move vertically, whereas the spring action of the seat back was in a horizontal direction. In truck seating this is known as "back scrubbing" and accordingly an undesirable ride characteristic, producing fatigue and often body injury. Direct suspension does not lend itself to "integral" seating.

It is a further object in the use of the present offset suspension to provide an integral seat assembly where the seat and back move simultaneously; something long desired in the automotive field.

The present integral seat also has a definite advantage in the passenger car field for producing ride comfort. Ladies' expensive fur coats and jackets do not receive this scrubbing action, and therefore have a longer life.

The present offset suspension lends itself to contour seating to provide better distribution of occupant's weight, not practical with conventional direct suspension. Contour seating is of paramount importance in the relief of fatigue, especially with truck drivers who have long hauls.

The present offset suspension seat will have a very definite place on trucks, jeeps and other vehicles used in the U.S. Army. Armed service records will show that the great majority of disability claims are from discharged service men who drive or rode trucks, jeeps, etc., during World War II. Claims center around back trouble, kidneys, hemorrhoids and similar ailments.

The present offset suspension seat will greatly enhance the performance of safety belts by absorbing collision energy. This is accomplished by the addition of a small block of rubber inside the upper suspension member at the front. With the safety belt attached to the rear of the upper member "opening" of the suspension (in case of collision) would be against the rubber on a leverage principle, thus "bringing up" the forward thrust of the occupant in a five or six inch range, thus substantially mitigating the shock. Storing safety belts and ease of attachment and removal would also be streamlined, due to the open space underneath between suspension members.

It is another object to provide a truck seat assembly including a lower suspension and an upper suspension pivotally interconnected and yieldingly mounted with respect to each other whereby the pivotal mounting of the upper suspension is displaced from the center of gravity of the user in the seat.

It is another object to provide manually adjustable means in the conjunction with the seat suspension and yielding means to permit adjustability of seat resiliency depending upon the weight of the user.

It is another object to provide a novel form of seat and backrest assembly associated with the upper suspension member together with improved means of cushioning the seat and backrest members.

These and other objects will be seen from the following specification and claims in conjunction with the appended drawings in which:

FIG. 3 is a section taken on line 3—3 of FIG. 1, but with the seat and backrest padding and upholstering included.

FIG. 4 is a fragmentary section of the backrest taken on line 4—4 of FIG. 3 with padding and upholstering omitted.

FIG. 5 is a fragmentary section of the seat assembly taken on line 5—5 of FIG. 3.

FIG. 6 is a section taken on line 6—6 of FIG. 3.

FIG. 7 is a fragmentary section taken on line 7—7 of FIG. 4.

FIG. 8 is a fragmentary section of the backrest taken on line 8—8 of FIG. 4.

FIG. 9 is a fragmentary view similar to FIG. 3 of a slightly different form of resilient upper suspension mounting.

FIG. 10 is a fragmentary section taken on line 10—10, FIG. 9.

FIG. 11 is a fragmentary prospective view of still another form of seat mounting constructed for vertical travel.

FIG. 12 is an end section of still another form of resilient mounting adaptable to the assembly in FIG. 11.

FIG. 13 is a side sectional view thereof.

FIG. 14 is a plan sectional view thereof.

Figures 1, 2:
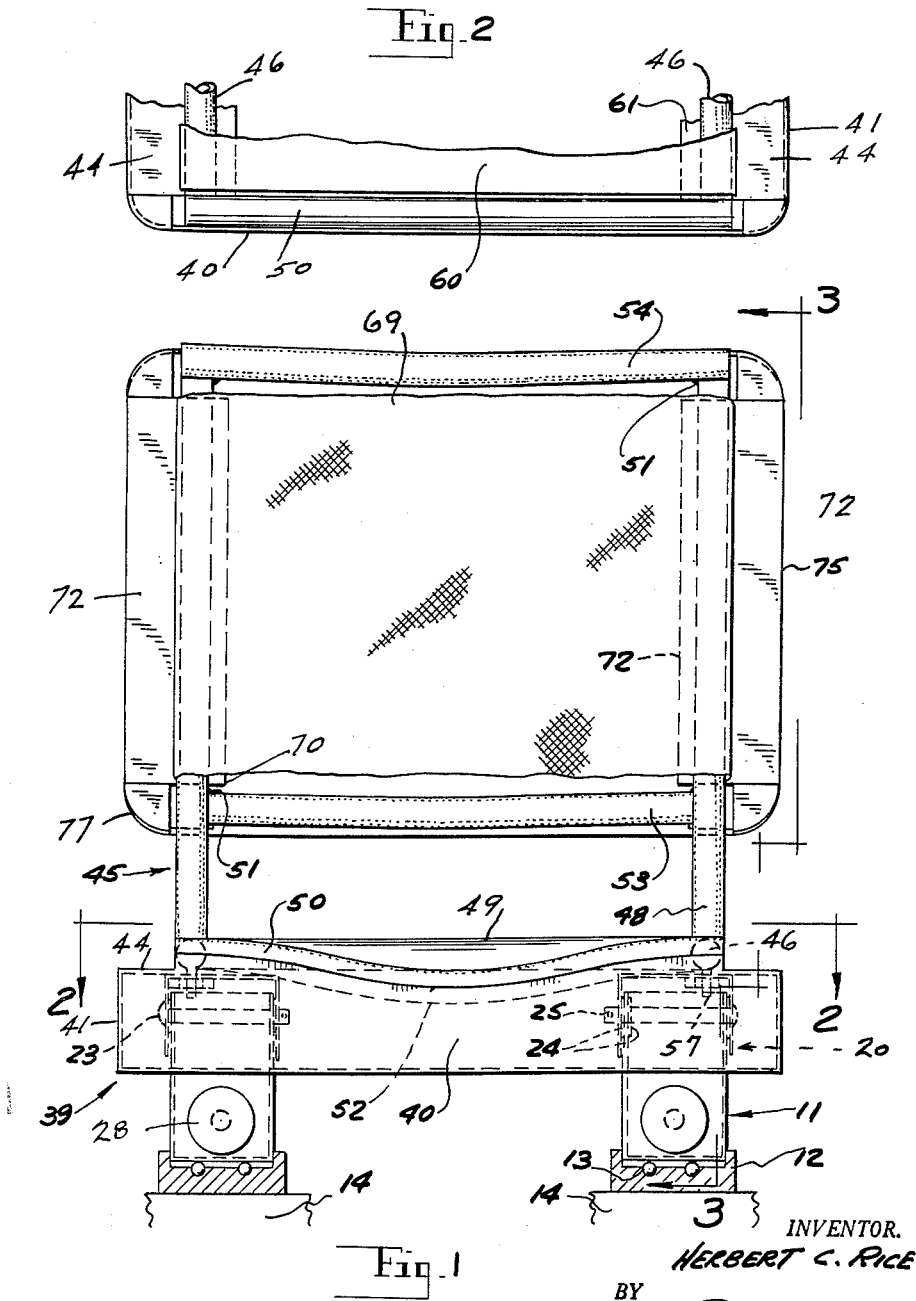
FIG. 1 is a fragmentary front elevational view of the present seat and backrest assembly with cushioning removed.
FIG. 2 is a fragmentary section taken on line 2—2 of FIG. 1.

FIGS. 15–16 similar to FIG. 9, fragmentarily illustrate a slightly different resilient mounting.

It will be understood that the above drawings illustrate merely preferred embodiments of the invention and that other embodiments are contemplated within the scope of the claims hereafter set forth.

Referring to the drawings, FIG. 1 illustrates fragmentarily a front elevational view of the present seat and backrest assembly with the upholstering omitted for clarity, and wherein a portion of the vehicle chassis is indicated at 14, upon which is mounted and secured the pair of risers 12. These include guide tracks and bearing means 13 for guidably supporting the pair of parallel spaced forwarding extending seat suspensions 11—20.

These are adapted for conventional forward and rearward movement; and the specific detail of this structure forms no part of the present invention and is omitted, it being understood that the present seat is thus supported upon the vehicle chassis for forward and rearward adjustments in a conventional manner to meet the comfort of the user.

The seat suspension includes a pair of laterally spaced lower suspension members movably mounted within the trackways of the respective risers 12. Each lower suspension member includes bottom wall 15, opposed upright parallel side walls 16 and upright front wall 17, FIG. 3. The side walls at their top edges taper rearwardly and downwardly at 18 and join upright rear flange 19.

As each of the pair of suspension members are the same only one thereof is described in detail. The upper suspension member 20, FIGS. 1 and 5 is of inverted U-shape in cross section generally for positioning over the lower suspension member 11 and includes the horizontally disposed top wall 21 and depending parallel spaced side walls 22 which are pivotally mounted upon the lower suspension member by means of the transverse headed pin 23, FIG. 1.

Said pin is supportably journaled upon the bearings 24 respectively secured upon the interiors of the upright walls forming part of the lower and upper suspension members 11 and 20 respectively, there being suitable cotter pins 25 or the like for maintaining the assembled relation of said pins. The side walls 22 of upper suspension member 20 taper rearwardly and upwardly at 26 as shown in FIG. 3.

Hollow platform 27 of rectangular shape in cross section is mounted within lower suspension member 11 with its side walls guidably positioned between side walls 16 of the lower suspension.

Headed control screw 28, arranged forwardly of the lower suspension member is adjustably threaded through nut 29 secured at 30 upon the interior of front wall 17. The rear end of screw 28 projects into and is retainingly engaged loosely by the front wall of the adjustable platform 27 employing lockwashers 31. Rotation of handscrew 28 effects longitudinal adjustments of platform 27 which carries upright resilient torque plate 32 secured at one end at 33 to the rear end of said platform.

The upper portion of said torque plate curves horizontally rearward at 34 overlying platform 27, and has secured thereto at 36 the upwardly extending tapered block 35 of yielding material. Block 35 is in the form of a resilient bumper whose upper free edge supportably engages and fulcrums the undersurface of upper suspension member 20 in cooperation with its pivotal support 23. Bumper 35, preferably of rubber, is arranged adjacent one side tof torque plate 34 as shown in FIG. 5. Depending from the opposite side of said torque plate is a second rubber or resilient bumper 37 secured to said plate at 38, and whose lower tapered end is supportably mounted upon hollow platform 27, completing the resilient torque action support for upper suspension member 20.

Bumpers 35 and 37 are preferably constructed on a hard resilient rubber of bumper type hardness providing a yielding support for the upper suspension member in conjunction with yielding torque plate 34, both of which cooperate in the resilient mounting of the upper suspension member.

A trim plate assembly spanning the pair of laterally spaced suspension members is generally indicated at 39, FIG. 1, and includes the transverse upright front plate 40 whose respective ends terminate in the rearwardly extending upright sides 41 with inturned bottom flanges 42 as in FIG. 5.

The sides 41 of the trim plate taper upwardly and rearwardly at 43 corresponding to the taper 26 of the sides of the upper suspension members. Side plates 41 terminate in the inwardly extending horizontal plates 44 respectively supported and secured upon the respective upper suspension members 20 as shown in FIGS. 1 and 5.

The seat and backrest frame assembly is generally indicated at 45 in FIG. 1, being in the nature of a unitary resilient frame which includes the elongated parallel spaced horizontally disposed tubular members 46, at their rear ends curved upwardly at 47 and terminating in the respective pair of upwardly and rearwardly extending backrest supporting tubes 48.

A series of transverse reinforcing tubes interconnect portions of tubes 46—48, including cross tube 49 and the transverse front tube 50 supportably secured thereto by the welds 51.

Front cross brace 50 bows downwardly as shown at 52 in FIG. 1. Spaced horizontally disposed cross tubular braces 53 and 54 respectively bow rearwardly at 55—56, FIG. 1. Said cross tubes are fixedly secured at their ends to the end tubular members 46—48 to define a tubular frame for the seat 65 and backrest 82.

A pair of threaded studs 57 are spot-welded or otherwise secured at 58 adjacent the front and rear respectively of the lower tubular side elements 46. These studs depend through corresponding apertures in plate 21 of the upper suspension members and corresponding trimplate 44, and receive the securing nuts 59, FIGS. 1, 3 and 5, whereby the seat and backrest frame structure and the formed trimplate 39 span and are secured to the pair of upper suspension members 20.

A yielding support of a suitable fabric such as canvas provides a transverse support webbing as at 60 for the seat 65. Referring to FIGS. 2 and 5, the transverse canvas strip 60 includes at its outer edges the reverse turned free ends 61 which overlie and are secured at their edges to the top surfaces of trimplates 44 as by the rivets 62. Upon assembly, the free ends of the tubular seat frame 46—50 are snugly projected between the reverse turned edges 61 of the canvas support with the depending mounting studs 57 projected through corresponding openings in the canvas for securing in the manner above described to the trimplate and associated upper suspension member.

The depending flange 64 on the trim plate assembly cooperatively engages the corresponding front flange 63 of the upper suspension members as shown in FIG. 3 for locating the said trim plate assembly with respect to said upper suspension member.

The yielding seat assembly 65 includes a suitable resilient padding 66 upon canvas 60 and said trim plate, which may be sponge rubber or hair or other yielding material, which is retained and confined by plastic covering 67 which may be Naugahyde. Covering 67 is stretched over said padding and extends downwardly over the front, rear and side walls of trim plate assembly, and terminal edge portions of said flexible covering 67 are suitably secured as by cement or otherwise to the bottom flange 42 of the said trim plate as illustrated at 68 in FIGS. 3 and 5 completing the seat assembly.

A similar assembly is provided for backrest 82 of the seat, which also includes the transverse webbing 69 of a suitable fabric, such as canvas, whose reverse turned edges 70 are secured by a series of rivets 71 to portions of trim plate 72 as shown in FIGS. 3, 4 and 8.

The reverse turned edges 70 of canvas webbing 69 snugly extend around the upright tubular members 48 of the backrest frame. Said tubular members 48 are rigidly secured to the backrest trim plate 72 by means of threaded studs 73 which are respectively secured as by spot welding to rear portions of tubes 48. These studs extend through portions of trim plate 72 and are fixedly secured thereto by nuts 74.

Said trim plate includes the right angular edges 75 and the inturned marginal flange 76. As viewed in FIGS. 1, 3, and 4, said trim plate includes corner members 77 and the marginal top and bottom strips 78 and 81 respectively, which extend along portions of the transverse top and bottom tubular members 53 and 54, and include the inwardly directed flanges 79 which engage edge portions of said transverse tubular members respectively, as in FIGS. 3, 4 and 7.

The backrest, generally indicated at 82, includes the yielding and resilient filler or padding 84 of sponge rubber, hair or other material, upholstered and retained against canvas 69 and trim plate 72 by the outer flexible plastic cover 83 of Naugahyde or the like, which extends over said padding and along the sides and edges of the trim plate 72, 75 and 76, and whose marginal portions are secured by cement or otherwise to rear portions of the trim plate, completing the assembly of resilient backrest 82.

FIGS. 9 and 10 show a slightly different arrangement of the assembly shown in FIG. 3, and wherein the flexible torque plate 34, preferably constructed of spring steel carries adjacent its outer end the transverse upwardly extending flexible bumper 35', preferably of rubber or the like whose upper end cooperatively engages the undersurfaces of the top plates 21 respectively of the upper suspension members 20.

Instead of the second bumper being mounted upon torque plate 34 as in FIG. 3, the second transversely arranged flexible yielding bumper 37' is mounted upon and secured to the adjustable support platform 27 and is normally spaced below the free end of the torque plate. In operation, the torque plate is essentially limited to flexing movements only, i.e., a vertical travel with the second bumpers 37' yieldingly and supportably engaging torque plate 34 in each of the suspensions only after initial downward flexing movements thereof.

FIGS. 11 shows a slightly different embodiment of the present invention wherein the same suspension structure is employed as above described in connection with FIG. 3. The main difference is that instead of employing a pair of parallel spaced forwardly extending seat suspensions as in FIG. 1, there are employed a pair of transversely spaced aligned lower suspension members 11' adapted to be suitably secured to the vehicle chassis. Corresponding upper suspension members 20' are arranged over the lower suspension members and pivotally connected thereto at their one ends as at 23'. The arrangement of the individual suspension members 11'-20' is exactly the same as in FIG. 3.

The structure for the yielding torque plate mounting for the upper suspension members 20' is exactly the same as that shown in FIG. 3, except that said suspension members have merely been rotated 90 degrees into alignment, and have been shortened.

A unitary L-shaped tubular seat and backrest support frame is shown at 86 generally corresponding to the seat and backrest frame of FIG. 3, whose lower horizontally disposed tubular support members span the respective upper suspension members 20' and are suitably secured thereto as at 57 in the same manner as in FIG. 3.

In this embodiment, the yielding mounting for the unitary seat and backrest frame provides merely vertical travel movements.

The seat and backrest frame 86 is normally reinforced with suitable additional cross members and trimplate structure is employed substantially the same as above described with respect to FIG. 3, and there are provided padded and upholstered seat and backrest assemblies substantially the same as above described with respective seat and backrest assemblies 65 and 82 of FIG. 3.

A slight variation of the suspension members is shown in FIGS. 12, 13 and 14 wherein the lower suspension member 87 is generally of U-shape in cross section adapted for mounting upon the vehicle chassis substantially the same as shown in FIGS. 3 or 11 and wherein there is provided for each lower suspension member a corresponding oppositely arranged upper suspension member 93 with depending side walls 92 to cooperatively engage the corresponding walls of the respective lower suspension members. Each lower suspension member includes bottom wall 88 positionable upon the vehicle chassis or suitable risers as described in connection with FIG. 1.

Each of the lower suspension members includes at one end the formed end plates 89 for cooperative registry with similar end plates 91 of the upper suspension member, pivotally interconnected as at 90, similar to the pivotal mounting 23 of FIG. 1.

A flexible torque plate 98, preferably of spring steel, is also employed for yielding supporting control for the relative pivotal movements of the upper suspension members 93 when in use. Upright support 94 is secured at 95 to the bottom wall of the lower suspension member adjacent one corner. A second support 96 is diagonally spaced from support 94 and depends downwardly from the top wall of the upper suspension member being secured thereto at 97, adjacent one corner.

The flexible torque plate 98 projects into the transverse slots 99 in the respective supports 94—96 and is secured thereto at its opposite ends. The torque plate thus provides a yielding support for upper suspension member 93 with respect to lower suspension member in cooperation with pivotal mounting 90.

The preferably rubber yielding bumper 100 is secured at 101 to the bottom wall of the lower suspension member and is normally spaced axially below the lower end of support 96. A second rubber bumper or other flexible support 102 is secured at 103 to the undersurface of upper suspension member 93 normally spaced from and in axial registry with support 94.

In operation, the rubber bumpers 100—102 respectively are adapted for additional yielding support and engagement with the corresponding torque plate supports 94—96 respectively only after initial flexing movements of upper suspension 93 with respect to lower suspension 87.

With respect to the seat assembly above described and particularly with respect to FIGS. 1 through 10 the present invention is directed to a seat assembly where the medium of resiliency is arranged forwardly of the center of gravity of the seat assembly, with a rigid torque member extending back to a point arranged forwardly of the center of gravity of the seat when in use.

The present construction employing a spring steel resilient torque plate as well as the rubber bumpers provides effective dampening of the vibrations produced by road conditions for producing a substantially level ride. This overcomes the objectionable amplitudes of movement in prior seat structures for vehicles.

By virtue of the torque action achieved through torque plate 34, the rigid member defining the upper suspension for the seat connects the medium of resiliency, mainly the bumpers 35—37 through the torque action of the spring steel torque plate 34; and wherein bumpers 35—37 are laterally displaced from each other.

The dampening and snubbing action achieved is made possible by this combined torque action and resiliency located forwardly of the center of gravity of the seat thus employing a leverage principle for providing substantially level ride comfort.

Accordingly the present invention overcomes the previous serious difficulty of continuous vibratory motion in many types of seat assemblies. The leverage action on the medium of resiliency thus provides for a complete range of absorption of undesired vibrations.

Therefore the user of the seat is not amenable to constant vertical vibrations in view of the absorption and dampening and knee action effect at the point of resiliency, thus overcoming the main objection of continuous motion in the older types of seat suspension, particularly as applied to trucks. Thus the present invention provides and gives to the rigid support member for the padded and upholstered seat an effective leverage on the medium of resiliency. There is thus employed a torsion control for an integral type of seat and wherein the heretofore objectionable back scrubbing due to independent multi-directional movements of the seat and backrest are eliminated.

Another safety factor resides in the adaptability of safety belts wherein the present seat assembly and mounting will actually absorb collision energy. Additional rubber bumpers 103, FIG. 3, are secured upon the upper ends of the front walls 17 of the lower suspension members. Bumpers 103 cooperatively and yieldingly engage forward positions of the upper suspension assembly for the purpose of limiting the opening counterclockwise relative movements of the upper suspension member 20 in the event of sudden stopping or a collision.

The present assembly contemplates a padded and upholstered seat and backrest eliminating the conventional no-sag or coil type of springs and thus preventing high points of wear in the seat and backrest.

In operation with respect to FIG. 3, for illustration, there is approximately ½ inch of deflection of the rubber bumpers 35—37 and torque plate 34 for a normal 3-inch deflection of the seat assembly at its center of gravity.

FIG. 15 fragmentarily illustrates a slightly different form of resilient seat suspension wherein the torque plate 34 and the connected bumpers 35—37 are omitted. The assembly is otherwise substantially the same as FIG. 3 with the exception that a single upwardly projecting rubber bumper 104 is secured at 105 directly upon hollow platform 27. The upper end of the bumper cooperatively and supportably, yet yieldingly, engages the undersurface of upper suspension 20 rearwardly of its pivotal mounting 23.

Still another variation is fragmentarily shown in FIG. 16 wherein instead of rubber bumper 104 of FIG. 15, there is employed coiled spring 106 secured at 107 to hollow platform 27. The upper end of said spring supportably and yieldingly engages the undersurface of upper suspension 20 rearwardly of its pivotal mounting 23.

Having described my invention, reference should now be had to the following claim.

I claim:

In a seat assembly for a vehicle having a chassis, a pair of transversely arranged aligned and spaced lower suspension members mounted on said chassis, a pair of transversely arranged aligned and spaced upper suspension members respectively mounted over said lower suspension members and pivotally joined at their one ends to the corresponding ends of said lower suspension members, spaced diagonally arranged upright supports within each pair of pivotally connected suspension members, one support depending from the upper suspension member and the other support projecting from the lower suspension member, a flexible torque plate interconnecting and secured at its ends to said support members respectively, and yielding flexible bumpers respectively secured to interior portions of said upper and lower suspension members spaced from the ends of the torque plate supports and adapted for yielding supporting engagement therewith upon initial flexing of said torque plate.

References Cited in the file of this patent

UNITED STATES PATENTS

| | | |
|---|---|---|
| 2,611,423 | Blum | Sept. 23, 1952 |
| 2,636,544 | Hickman | Apr. 28, 1953 |
| 2,660,222 | Woodsworth | Nov. 24, 1953 |
| 2,679,992 | Schuette | June 1, 1954 |
| 2,729,443 | Olinger | Jan. 3, 1956 |
| 2,812,009 | Skirvin | Nov. 5, 1957 |
| 2,821,239 | Brendel | Jan. 28, 1958 |
| 2,839,126 | O'Neill | June 17, 1958 |

FOREIGN PATENTS

| | | |
|---|---|---|
| 33,758 | France | Aug. 7, 1928 |
| | (First addition to 626,527) | |
| 652,135 | France | Oct. 22, 1928 |